United States Patent
Nakamura

(10) Patent No.: US 12,467,775 B2
(45) Date of Patent: Nov. 11, 2025

(54) VOID FRACTION SENSOR, FLOWMETER USING THE SAME, AND CRYOGENIC LIQUID TRANSFER PIPE

(71) Applicant: KYOCERA Corporation, Kyoto (JP)

(72) Inventor: Katsumi Nakamura, Koka (JP)

(73) Assignee: KYOCERA Corporation, Kyoto (JP)

( * ) Notice: Subject to any disclaimer, the term of this patent is extended or adjusted under 35 U.S.C. 154(b) by 288 days.

(21) Appl. No.: 18/274,968

(22) PCT Filed: Jan. 27, 2022

(86) PCT No.: PCT/JP2022/003170
§ 371 (c)(1),
(2) Date: Jul. 28, 2023

(87) PCT Pub. No.: WO2022/163779
PCT Pub. Date: Aug. 4, 2022

(65) Prior Publication Data
US 2024/0110820 A1    Apr. 4, 2024

(30) Foreign Application Priority Data

Jan. 29, 2021   (JP) ................. 2021-013401

(51) Int. Cl.
| | | |
|---|---|---|
| *G01F 1/64* | (2006.01) |
| *G01F 1/58* | (2006.01) |
| *G01F 1/74* | (2006.01) |
| *G01N 27/22* | (2006.01) |
| *G01D 11/24* | (2006.01) |

(52) U.S. Cl.
CPC ............. *G01F 1/64* (2013.01); *G01F 1/584* (2013.01); *G01F 1/74* (2013.01); *G01N 27/22* (2013.01); *G01N 27/226* (2013.01); *G01D 11/245* (2013.01)

(58) Field of Classification Search
CPC . G01F 1/64; G01F 1/584; G01F 1/588; G01F 1/74; G01N 27/22; G01N 27/226; G01D 11/24; G01D 11/245
See application file for complete search history.

(56) References Cited

FOREIGN PATENT DOCUMENTS

| | | | | |
|---|---|---|---|---|
| JP | 2005055276 A | * | 3/2005 | ............. G01F 1/58 |
| JP | 2010107487 A | * | 5/2010 | ............. G01N 27/02 |

OTHER PUBLICATIONS

Maeno et al., "Void Fraction Measurement of Cryogenic Two Phase Flow Using a Capacitance Sensor", vol. 12, No. ists29, pp. Pa_101-Pa_107, 2014.

* cited by examiner

*Primary Examiner* — Benjamin R Schmitt
(74) *Attorney, Agent, or Firm* — Procopio, Cory, Hargreaves & Savitch LLP

(57) ABSTRACT

A void fraction sensor according to the present disclosure includes an insulating pipe having a through hole through which a cryogenic liquid flows, and a pair of planar electrodes mounted on an outer wall surface of the insulating pipe. The insulating pipe has electrode mounting portions at which a distance D1 between inner wall surfaces in a direction perpendicular to electrode surfaces of the pair of planar electrodes is shorter than a distance D2 between inner wall surfaces in a direction parallel to the electrode surfaces of the pair of planar electrodes.

16 Claims, 16 Drawing Sheets

VOID FRACTION SENSOR, FLOWMETER USING THE SAME, AND CRYOGENIC LIQUID TRANSFER PIPE

TECHNICAL FIELD

The present disclosure relates to a void fraction sensor for measuring a void fraction of a cryogenic liquid such as liquid hydrogen, a flowmeter using the same, and a cryogenic liquid transfer pipe.

BACKGROUND OF INVENTION

With the recent trend of reducing greenhouse gas emissions, the use of hydrogen as a potent energy storage medium has been attracting attention. In particular, liquid hydrogen has a high volumetric efficiency and can be stored for a long period of time, and various techniques for utilizing liquid hydrogen have been developed. However, a method for accurately measuring the flow rate which is required in handling a large volume of liquid hydrogen for industrial use has not been established. A major reason for this is that liquid hydrogen is a fluid that is very easily vaporized and its gas-to-liquid ratio fluctuates greatly.

That is, liquid hydrogen is a liquid having an extremely low temperature (boiling point −253° C.) and having very high thermal conductivity and low latent heat, which causes immediate generation of voids. Therefore, in a transfer pipe, liquid hydrogen is in a so-called two-phase flow in which gas and liquid are mixed.
Because of the large fluctuation of the void content percentage, the flow rate of the liquid hydrogen cannot be accurately determined by only measuring the flow velocity in the pipe, as in ordinary liquids, when measuring the flow rate of the liquid hydrogen flowing in the pipe.

In view of the above, a void fraction sensor that measures a void fraction indicating a gas phase volume percentage of the gas-liquid two phase flow is under development. As such a void fraction sensor, Non-Patent Document 1 has proposed a capacitance-type void fraction sensor that measures capacitance using a pair of electrodes.

CITATION LIST

Non-Patent Literature

Non-Patent Document 1: Norihide MAENO et al. (5), "Void Fraction Measurement of Cryogenic Two Phase Flow Using a Capacitance Sensor", Trans. JSASS Aerospace Tech. Japan, Vol. 12, No. ists 29, pp. Pa_101-Pa_107, 2014

SUMMARY

Summary of the Invention

A void fraction sensor according to the present disclosure includes an insulating pipe having a through hole through which a cryogenic liquid flows, and a pair of planar electrodes mounted on an outer wall surface of the insulating pipe. The insulating pipe has electrode mounting portions at which a distance D1 between inner wall surfaces in a direction perpendicular to electrode surfaces of the pair of planar electrodes is shorter than a distance D2 between inner wall surfaces in a direction parallel to the electrode surfaces of the pair of planar electrodes.

A flowmeter according to the present disclosure measures a flow rate of a cryogenic liquid flowing in a through hole of a pipe, and includes the void fraction sensor described above, and a flow velocity meter configured to measure a flow velocity of the cryogenic liquid flowing through the through hole.
The present disclosure also provides a cryogenic liquid transfer pipe provided with the flowmeter described above.

DESCRIPTION OF EMBODIMENTS

Hereinafter, a void fraction sensor according to an embodiment of the present disclosure will be described.

Figure 1:
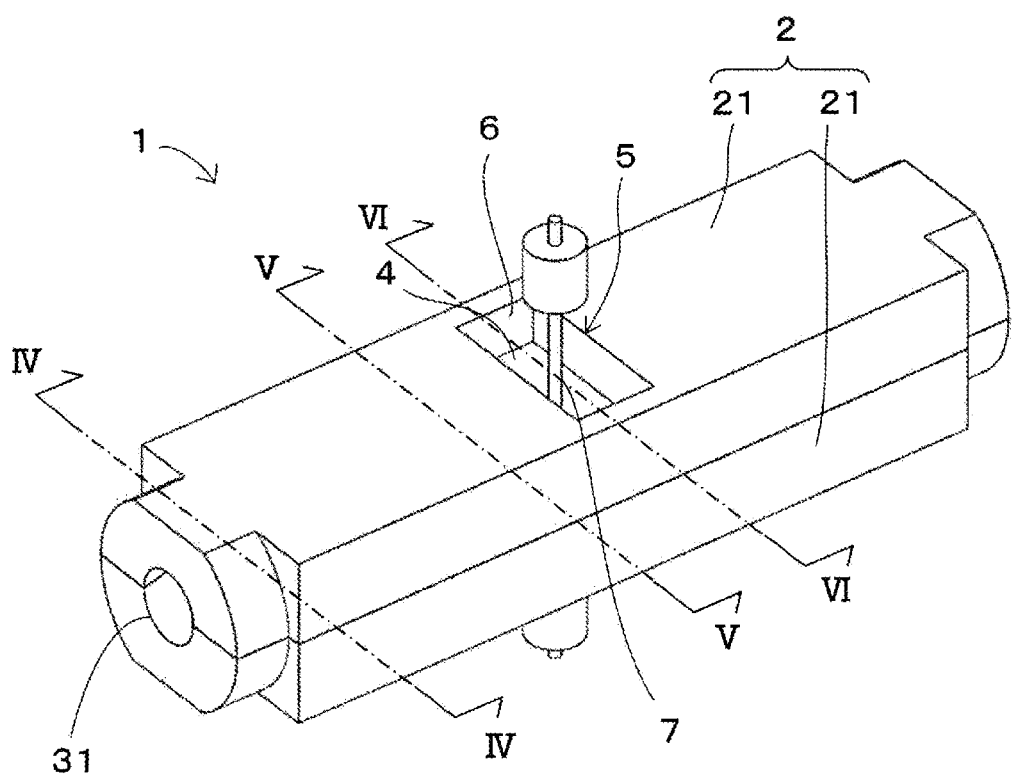
FIG. 1 is a schematic perspective view illustrating a void fraction sensor according to an embodiment of the present disclosure.
Figure 2:
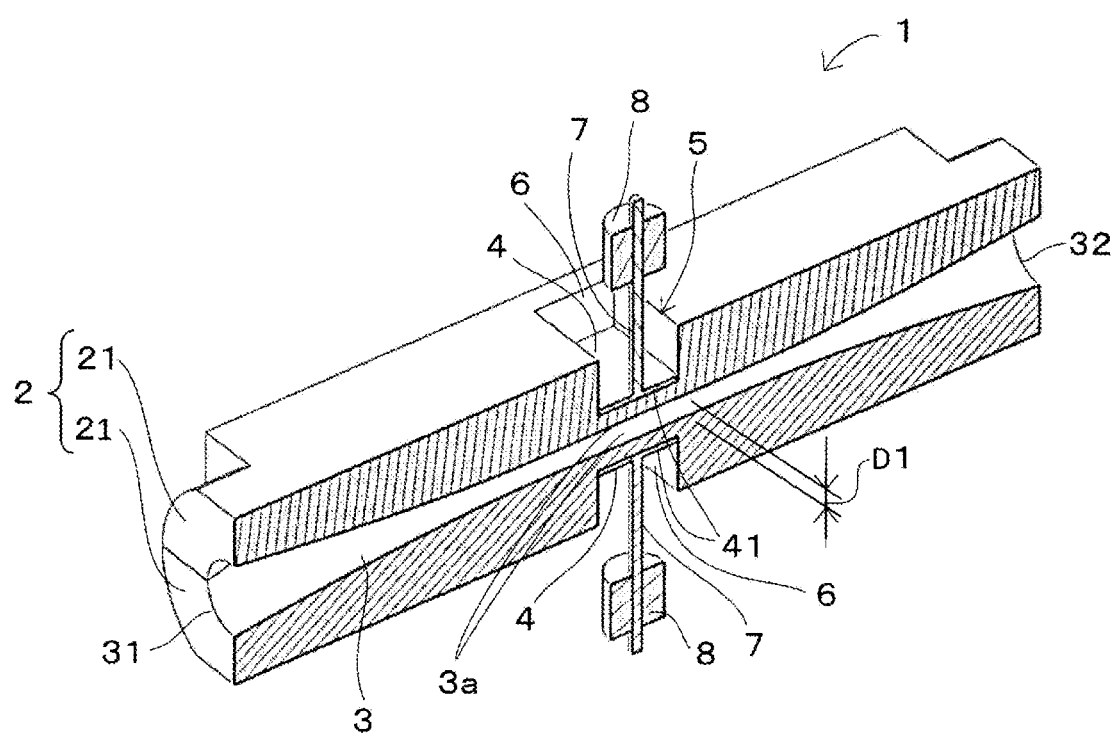
FIG. 2 is a schematic perspective view illustrating a vertical cutaway surface of the void fraction sensor illustrated in FIG. 1.
Figure 3:
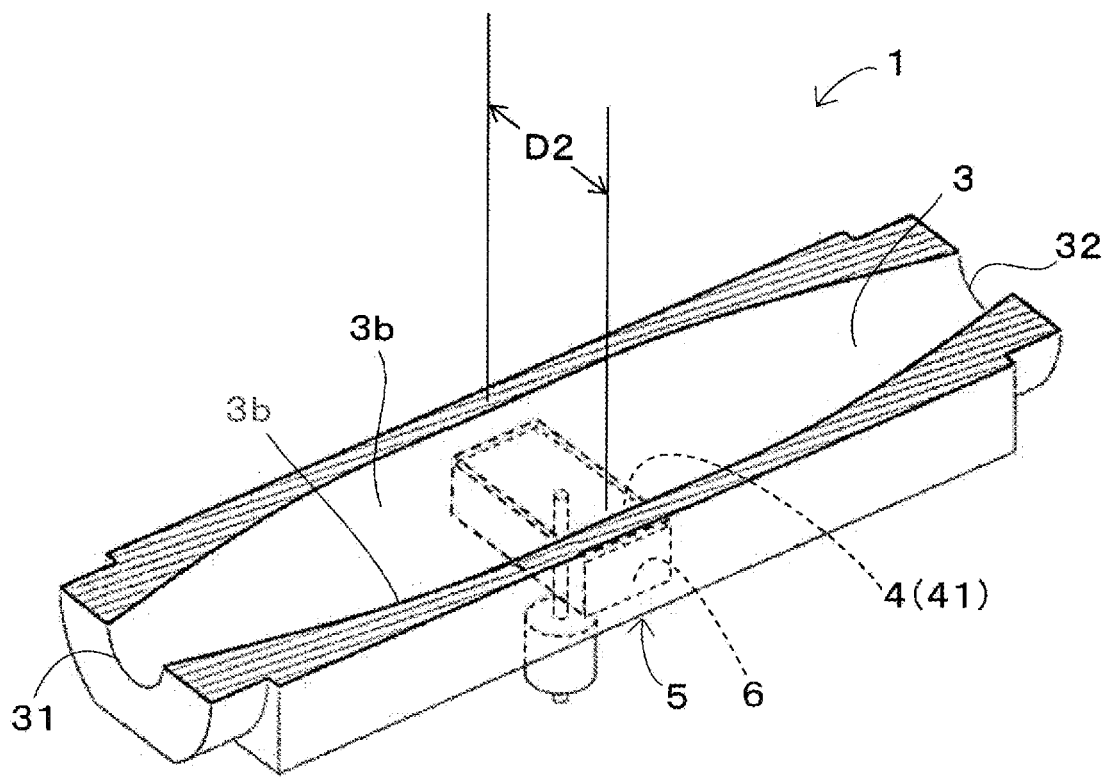
FIG. 3 is a schematic perspective view illustrating a horizontal cutaway surface of the void fraction sensor illustrated in FIG. 1.

FIG. 1 is a perspective view illustrating a void fraction sensor 1 according to an embodiment of the present disclosure, and FIGS. 2 and 3 are schematic perspective views illustrating a vertical cutaway surface and a horizontal cutaway surface, respectively, of the void fraction sensor 1. As illustrated in FIGS. 2 and 3, the void fraction sensor 1 includes an insulating pipe 2 having a through hole 3 through which a cryogenic liquid flows, and a pair of planar electrodes 4, 4 mounted on an outer wall surface of the insulating pipe 2.

As illustrated in FIG. 1, the insulating pipe 2 is formed by overlapping two halved insulating pipe members 21, 21 with each other. The insulating pipe 2 has a pair of recessed portions 6, 6 which are open to an outside of the insulating pipe 2 in a direction perpendicular to an axial center of the through hole 3. The pair of electrodes 4, 4 are mounted on the bottom surfaces of the recessed portions 6, 6 provided in the insulating pipe 2, respectively, and face each other (see FIG. 2).

A conductive pin 7 is connected to each of the electrodes 4. A hermetic terminal 8 is attached to the conductive pin 7. The hermetic terminal 8 will be described later.

Since the recessed portions 6, 6 are formed in the insulating pipe 2 as described above, the distance between the electrodes 4, 4 mounted on the bottom surfaces of the recessed portions 6, 6 becomes narrow. This increases the capacitance accumulated between the electrodes 4, 4, and improves the measurement accuracy of the void fraction of the cryogenic liquid flowing through the through hole 3. The positions of the electrodes 4, 4 and the areas of the electrode surfaces 41 can be set to achieve optimum measurement accuracy. Here, the electrode surfaces 41, 41 refer to the surfaces on which the electrodes 4, 4 are mounted on the bottom surfaces of the recessed portions 6, 6.

In the present embodiment, as illustrated in FIGS. 2 and 3, to prevent a decrease in the supply amount of the cryogenic liquid, a distance D1 between inner wall surfaces 3a, 3a in a direction perpendicular to the electrode surfaces 41, 41 of the electrodes 4, 4 is set to be shorter than a distance D2 between inner wall surfaces 3b, 3b in a direction parallel to the electrode surfaces 41, 41 in electrode mounting portions 5 of the insulating pipe 2. In other words, since the distance D2 in the parallel direction is larger than the distance D1 in the perpendicular direction, the supply amount of the cryogenic liquid can be maintained without being reduced even when the distance between the electrodes 4, 4 is narrow and thus the distance D1 is short. This also means that, when the supply amount of the cryogenic liquid increases, the measurement accuracy of the void fraction can be maintained without being lowered.

The distance D1 indicates the shortest distance between the inner wall surfaces 3a, 3a of the electrode mounting portions 5, and the distance D2 indicates the longest distance between the inner wall surfaces 3b, 3b. Here, the distances D1 and D2 can be appropriately determined according to the supply amount of the cryogenic liquid, the measurement accuracy of the void fraction, and the like, and are not particularly limited, but the distance D1 is usually at least 10%, preferably at least 20%, and 67% or less, and more preferably 50% or less of the distance D2.

Therefore, at least the shape of the cross section of the through hole 3 perpendicular to an axial center of the through hole 3 in the electrode mounting portions 5 is preferably elliptical or rectangular. Thus, the shape of the through hole 3 in the cross section is a simple shape and has no ridge line along an axial center, suppressing variation in void generation and improving the measurement accuracy of the void fraction.

The electrode mounting portions 5 refer to portions where the electrodes 4, 4 are to be mounted, and specifically refer to portions interposed between bottom surfaces including the bottom surfaces of the recessed portions 6, 6 where the electrodes 4, 4 are to be mounted.

Figure 4:
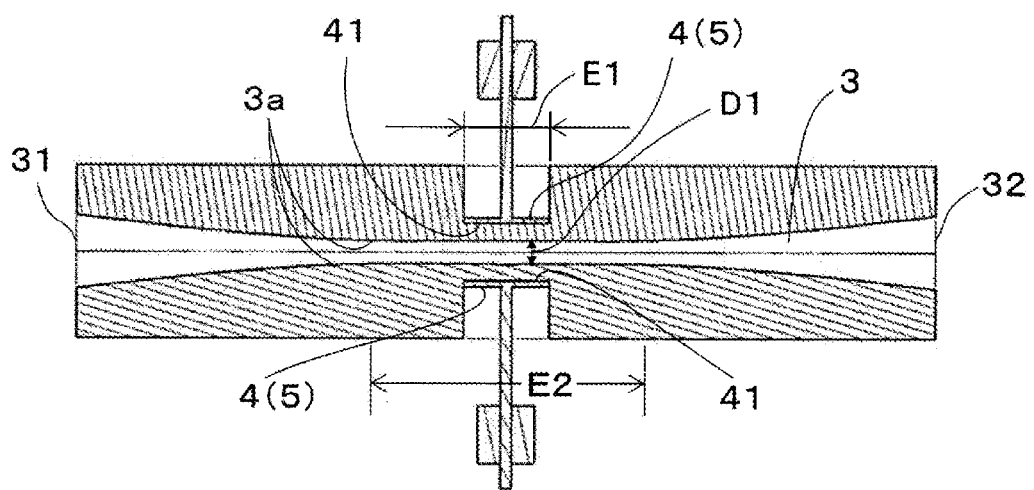
FIG. 4 is a vertical cross-sectional view of the void fraction sensor illustrated in FIG. 1.
Figure 5:
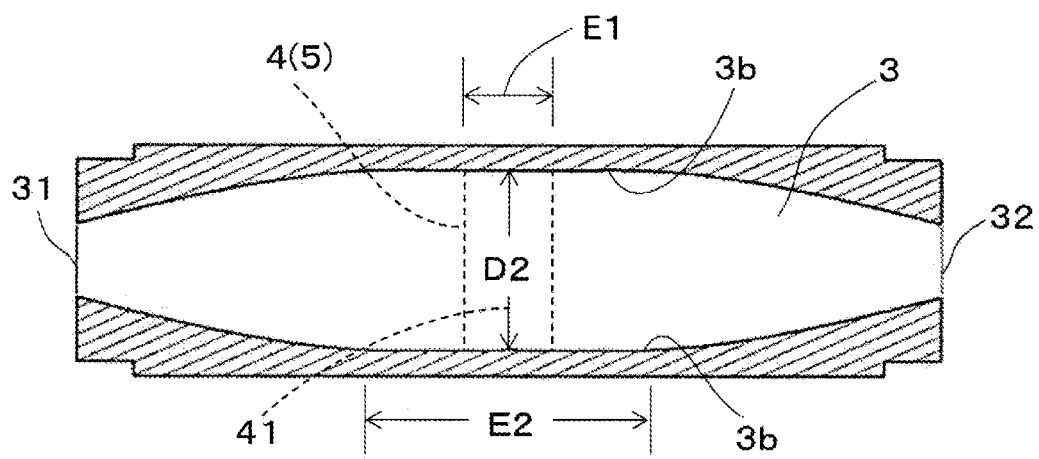
FIG. 5 is a horizontal cross-sectional view of the void fraction sensor illustrated in FIG. 1.

As illustrated in FIG. 4, the distance between the inner wall surfaces 3a, 3a of the insulating pipe 2 decreases smoothly and progressively from the circular inflow opening 31 and the circular outflow opening 32 of the cryogenic liquid to the edges of a parallel region E2, respectively, in the vertical cross section in the direction perpendicular to the electrode surfaces 41, 41. On the other hand, as illustrated in FIG. 5, the distance between the inner wall surfaces 3b, 3b of the insulating pipe 2 smoothly decreases from the parallel region E2 to the inflow opening 31 and the outflow opening 32 of the through hole 3 in the horizontal cross section in the direction horizontal to the electrode surfaces 41, 41. In the parallel region E2, the inner wall surfaces 3a, 3a of the through hole 3 are parallel to each other, and the distance D1 is minimal. The inner wall surfaces 3b, 3b of the through hole 3 are parallel to each other, and the distance D2 is maximal. By changing the distance between the inner wall surfaces 3a, 3a and the distance between the inner wall surfaces 3b, 3b in this way, the cross-sectional area of the through hole 3 in the cross section perpendicular to an axial direction of the through hole 3 can be kept constant. The electrode mounting regions E1 (that is, the electrode mounting portions 5) are preferably included in the parallel region E2, and the electrode mounting regions E1 are preferably located substantially at the center of the parallel region E2.

As described above, in the vertical cross section in the direction perpendicular to the electrode surfaces 41, 41, the distance between the inner wall surfaces 3a, 3a smoothly increases from the parallel region E2 to the inflow opening 31 and the outflow opening 32 of the through hole 3. This decreases the likelihood of generating stress concentration on the inner wall surfaces 3a, 3a than when the distance between the inner wall surfaces 3a, 3a increases stepwise toward the inflow opening 31 and outflow opening 32, thus allowing a longer period of time for use. Similarly, in the horizontal cross section in the direction horizontal to the electrode surfaces 41, 41, the distance between the inner wall surfaces 3b, 3b smoothly decreases from the parallel region E2 to the inflow opening 31 and the outflow opening 32 of the through hole 3. This decreases the likelihood of generating stress concentration on the inner wall surfaces 3b, 3b than when the distance between the inner wall surfaces 3b, 3b increases stepwise toward the inflow opening 31 and outflow opening 32, thus allowing a longer period of time for use. The parallel region E2 is provided and the electrode mounting regions E1 are provided in the parallel region E2, enabling the lines of electric force generated between the electrode surfaces 41, 41 to vertically penetrate the cryogenic liquid flowing from the inflow opening 31 toward the outflow opening 32. Thus, the measurement accuracy improves.

The length of the parallel region E2 is at least 105%, preferably at least 150% of the electrode regions E1, and 5000% or less thereof.

Alternatively, the inner wall surfaces 3a, 3a need not have the parallel region E2, and at least one inner wall surface of the inner wall surfaces 3a, 3a may be curved such that the distance D1 therebetween continuously decreases from the inflow opening 31 and the outflow opening 32 toward the electrode mounting portions 5. The inner wall surfaces 3a, 3a are preferably curved concavely when viewed from an axial center of the through hole 3. Similarly, the inner wall surfaces 3b, 3b need not have the parallel region E2, and at least one inner wall surface of the inner wall surfaces 3b, 3b may be curved such that the distance D2 therebetween continuously increases from the inflow opening 31 and the outflow opening 32 toward the electrode mounting portions 5. The inner wall surfaces 3b, 3b may be curved convexly when viewed from an axial center of the through hole 3.

Figure 6:
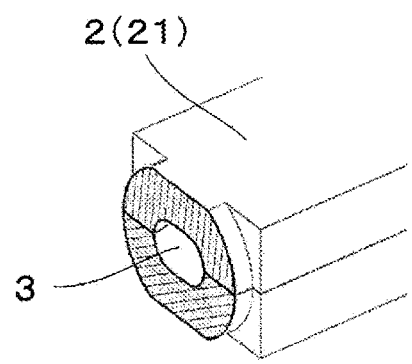
FIG. 6 is a cross-sectional view taken along line IV-IV of the void fraction sensor illustrated in FIG. 1.
Figure 7:
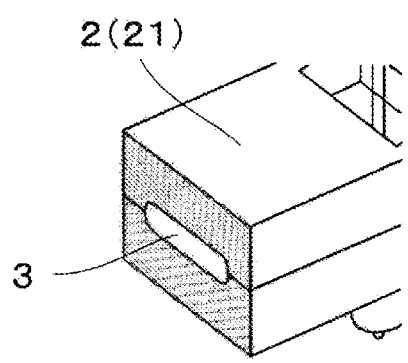
FIG. 7 is a cross-sectional view taken along line V-V of the void fraction sensor illustrated in FIG. 1.
Figure 8:
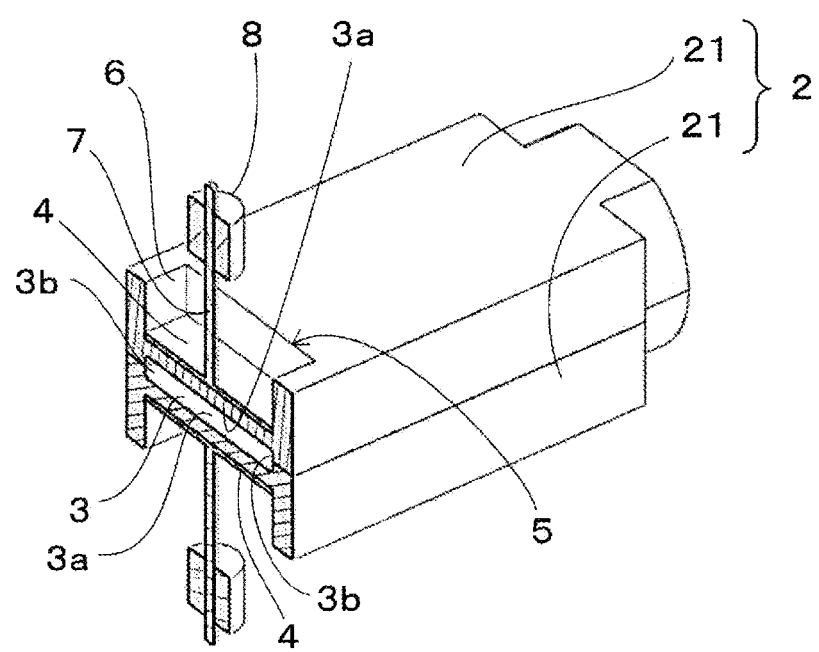
FIG. 8 is a cross-sectional view taken along line VI-VI of the void fraction sensor illustrated in FIG. 1.

FIGS. 6 to 8 illustrate how the shape of the through hole 3 sequentially changes from the inflow opening 31 of the through hole 3 toward the electrode mounting portions 5 thereof. The through holes 3 illustrated in FIGS. 6 to 8 have the same cross sectional area perpendicular to an axial center of the through holes 3. Thus, the supply amount of the cryogenic liquid can be maintained without being reduced.

Figure 9:
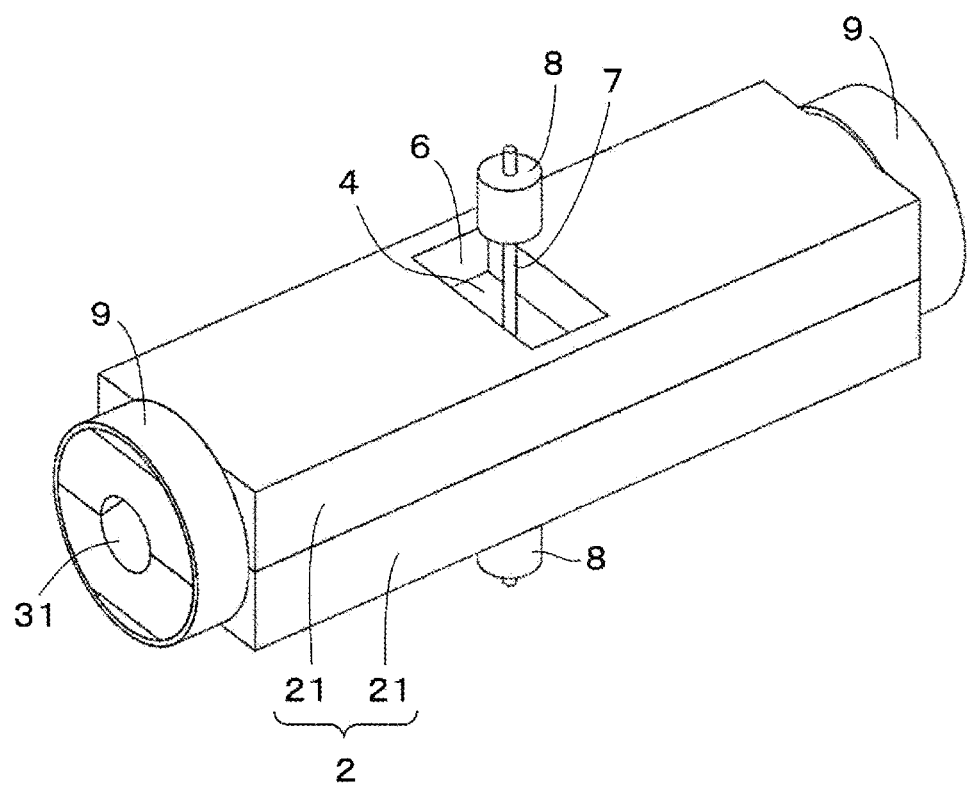
FIG. 9 is a schematic perspective view of the void fraction sensor in which binding bodies are attached respectively to outer peripheral surfaces of an inflow opening and outflow opening of an insulating pipe.

As described above, the insulating pipe 2 according to the present embodiment is formed by overlapping the two halved insulating pipe members 21, 21 with each other. Subsequently, as illustrated in FIG. 9, binding bodies 9, which are annular, are annularly mounted respectively on the outer peripheral surfaces of the inflow opening and the outflow opening of the insulating pipe 2 to bond and unify the halved insulating pipe members 21, 21. The insulating pipe members 21, 21 may be bound by the binding bodies 9 without using a bonding material. Alternatively, instead of, or together with the binding bodies 9, the bonding surfaces of the insulating pipe members 21, 21 may be bonded with a sealing material which is stable against the cryogenic liquid flowing through the insulating pipe 2.

Figure 10:
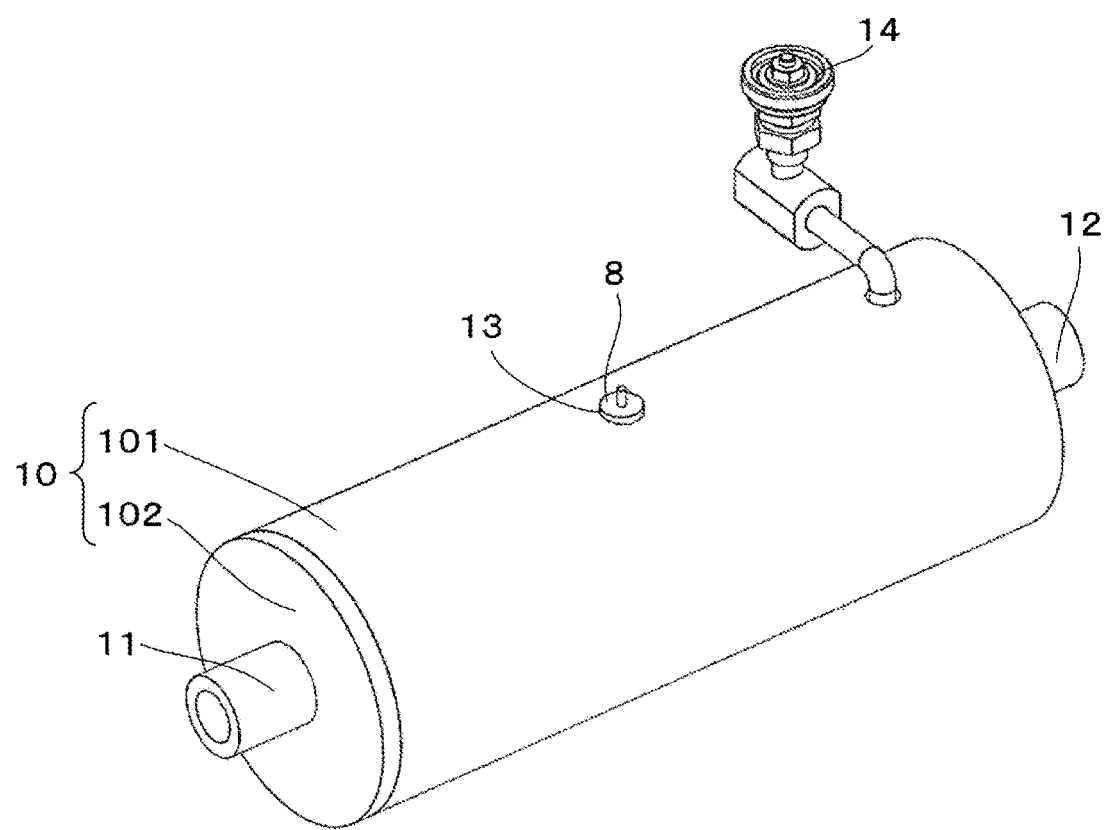
FIG. 10 is a schematic perspective view illustrating a state in which the void fraction sensor illustrated in FIG. 1 is accommodated in a housing.

FIG. 10 illustrates a state in which the void fraction sensor 1 is accommodated in a housing 10. The void fraction sensor 1 is surrounded by the housing 10.

Figure 11:
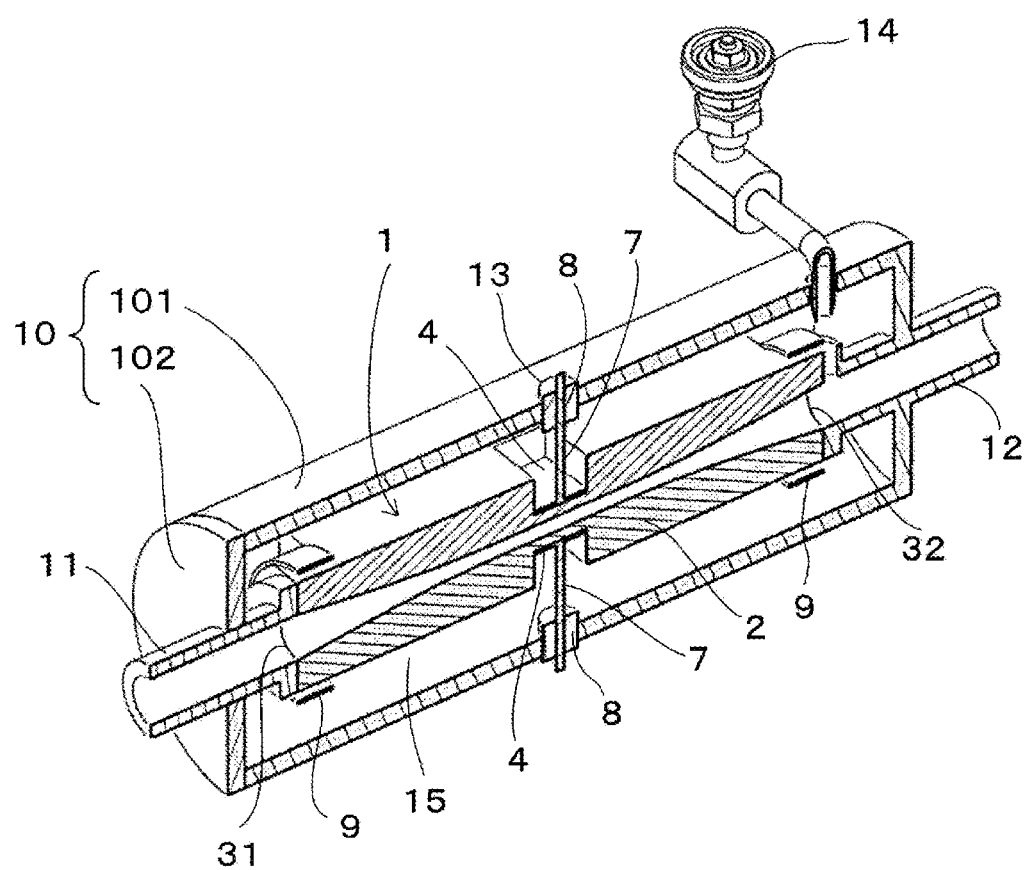
FIG. 11 is a schematic perspective view illustrating a vertical cutaway surface of the void fraction sensor and the housing illustrated in FIG. 10.
Figure 12:
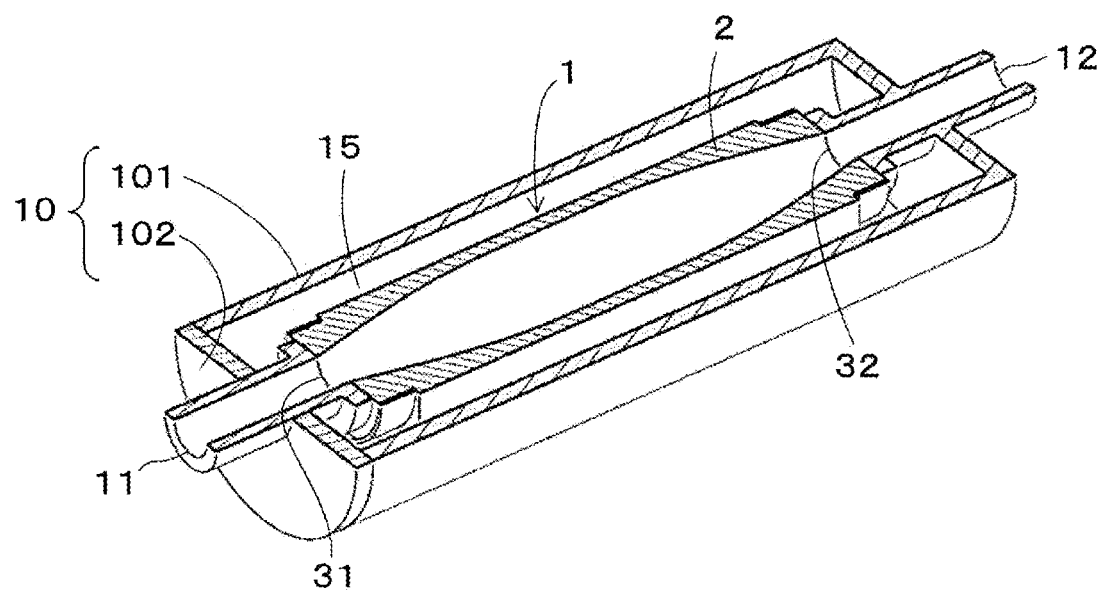
FIG. 12 is a schematic perspective view illustrating a horizontal cutaway surface of the void fraction sensor and the housing illustrated in FIG. 11.

As illustrated in FIG. 11 which is a schematic perspective view illustrating a vertical cutaway surface of the housing 10 and FIG. 12 which is a schematic perspective view illustrating a horizontal cutaway surface of the housing 10, the housing 10 includes a frame body 101 accommodating the void fraction sensor 1 and a cover portion 102 sealing the opening of the frame body 101.

The void fraction sensor 1 in which the insulating pipe members 21, 21 illustrated in FIG. 9 are bound by the binding bodies 9 is accommodated in the frame body 101, and then the frame body 101 and the cover portion 102 are bonded to each other by welding or brazing. A first connecting pipe 11 and a second connecting pipe 12 are respectively connected to both end openings (the inflow opening 31 and the outflow opening 32) of the through hole 3 of the void fraction sensor 1.

The first connecting pipe 11 is inserted into the inflow opening 31, and an outer peripheral surface thereof is bonded to the cover portion 102 by welding or brazing. The second connecting pipe 12 is formed integrally with the frame body 101, but may be bonded to the frame body 101 in the same manner as the cover portion 102.

An insertion hole 13 is formed in the frame body 101 of the housing 10. The hermetic terminal 8 is provided in the insertion hole 13, and the conductive pin 7 individually connected to each electrode 4 is fixed in the insertion hole 13.

The housing 10 is provided with a vacuum exhaust valve 14 (needle valve or the like for vacuum exhaust) and a vacuum space 15 (heat insulating layer) is formed between the void fraction sensor 1 and the housing 10. Thus, the vacuum space 15 is present on the outer peripheral side of the void fraction sensor 1, ensuring heat insulation performance for the void fraction sensor 1. As a result, the generation of voids due to the effect of the outside air temperature is suppressed, thus improving the measurement accuracy of the void fraction. The hermetic terminal 8 suppresses a leakage of the cryogenic liquid from the void fraction sensor 1 to the outside, leading to further improvement of the measurement accuracy of the void fraction.

As illustrated in FIGS. 11 and 12, the first connecting pipe 11 having a supply hole on the inflow opening 31 side of the through hole 3 is connected to the insulating pipe 2, in which a cross-sectional area of the through hole 3 perpendicular to an axial center of the through hole 3 is preferably from 90% to 110% of the cross-sectional area of the supply hole perpendicular to an axial center of the supply hole. Although a pressure loss of the cryogenic liquid that flows at a high speed usually increases in the vicinity of the connecting portion between the supply hole and the through hole 3, the structure described above can suppress the increase in the pressure loss. As a result, the generation of voids is suppressed, thus improving the measurement accuracy of the void fraction of the cryogenic liquid.

Similarly, the second connecting pipe 12 having a discharge hole on the outflow opening 32 side of the through hole 3 is connected to the insulating pipe 2, and the cross-sectional area of the through hole 3 perpendicular to an axial center of the through hole 3 is preferably from 90% to 110% of the cross-sectional area of the discharge hole perpendicular to an axial center of the discharge hole. This suppresses an increase in pressure loss. As a result, the generation of voids is suppressed, thus improving the measurement accuracy of the void fraction of the cryogenic liquid.

The frame body 101 and the cover portion 102 that constitute the housing 10 are made of a metal or a ceramic. The first connecting pipe 11 and the second connecting pipe 12 are preferably metal pipes. Specifically, the frame body 101 is preferably made of, for example, an austenitic stainless steel (for example, SUS316L) having a nickel content of at least 10.4 mass %, or a ceramic such as silicon nitride, sialon, or the like.

The cover portion 102 is preferably made of, for example, a Fernico alloy, an Fe—Ni alloy, an Fe—Ni—Cr—Ti—Al alloy, an Fe—Cr—Al alloy, an Fe—Co—Cr alloy, or the like.

To achieve a sufficient heat insulating performance, the inner diameter of the frame body 101 is at least 1 mm, preferably at least 10 mm, with respect to the outer diameter of the insulating pipe 2, and is 200 mm or less, preferably 100 mm or less, with respect to the outer diameter of the insulating pipe 2. The cover portion 102 is hermetically bonded to the outer peripheral surface of the insulating pipe 2 by brazing.

The electrodes 4, 4 can be made of, for example, copper foil, aluminum foil, or the like. Each electrode 4 can be formed on the bottom surface of each recessed portion 6 by, for example, vacuum evaporation, metallization, or using an active metal method. Alternatively, a metal plate serving as the electrode 4 may be bonded to the bottom surface of the recessed portion 6. The thicknesses of the electrodes 4, 4 are at least 10 μm, preferably at least 20 μm, and 2 mm or less, preferably 1 mm or less.

Examples of a ceramic constituting the insulating pipe 2 include ceramics containing zirconia, alumina, sapphire, aluminum nitride, silicon nitride, sialon, cordierite, mullite, yttria, silicon carbide, cermet, and β-eucryptite as a main component. When the ceramic is made of a ceramic containing alumina as a main component, the ceramic may contain an oxide of silicon, calcium, magnesium, sodium, or the like.

The main component of a ceramic refers to a component accounting for at least 60 mass % out of 100 mass % of all components constituting the ceramic. In particular, the main component may preferably be a component that accounts for at least 95 mass % out of 100 mass % of the components constituting the ceramic. The components constituting the ceramic may be obtained by using an X-ray diffractometer (XRD). For the content of each component, after the component is identified, the content of elements constituting the component is determined using a fluorescence X-ray analyzer (XRF) or an ICP emission spectrophotometer, and may be converted into the identified component.

The insulating pipe 2 is preferably made of a low-thermal-expansion ceramic. The low-thermal-expansion ceramic refers to a ceramic having a coefficient of linear expansion of 0±20 ppb/K or less at 22° C., where the temperature range for measuring the coefficient of linear expansion is from 0° C. to 50° C. The low-thermal-expansion ceramic having a low coefficient of linear expansion has less likelihood of breakage even when it is subjected to thermal shock caused by a cryogenic liquid including hydrogen liquid. The coefficient of linear expansion of the low-thermal-expansion ceramic may be determined using, for example, an optical heterodyne common-path interferometer.

Specifically, the low-thermal-expansion ceramic preferably contains cordierite as a main crystal phase, alumina, mullite, and sapphirine as a sub-crystal phase, and an amorphous phase containing Ca as a grain boundary phase. The crystal phase ratio of the main crystal phase accounts for 95 mass % to 97.5 mass %, the crystal phase ratio of the sub-crystal phase accounts for 2.5 mass % to 5 mass %, the content of Ca in the total amount is from 0.4 mass % to 0.6 mass % in terms of CaO. In addition, zirconia is contained, with a content of zirconia in the total amount being preferably from 0.1 mass % to 1.0 mass %. Thus, the low-thermal-expansion ceramic can be used over a long period of time, as it is less expandable even when the temperature of the cryogenic liquid changes greatly. For example, as such a low-thermal-expansion ceramic, one described in Japanese Patent No. 5430389 B can be employed.

The ceramic constituting the insulating pipe 2 preferably has a relative permittivity of 11 or less in an operating temperature range. The cryogenic liquid has a small relative permittivity, and when the relative permittivity of the ceramic is small, it becomes close to that of the cryogenic liquid. This improves a high frequency characteristic, leading to further improvement of the measurement accuracy of the void fraction. In particular, when the relative permittivity of the ceramic is 11 or less, the measurement accuracy of the void fraction of the cryogenic liquid can further be improved. The operating temperature range refers to a temperature range during transfer of the cryogenic liquid.

The insulating pipe 2 may be made of a ceramic containing silicon nitride or sialon as a main component. Having a high mechanical strength and a thermal shock resistance, these ceramics have less likelihood of breakage even when they are subjected to thermal shock.

Specifically, these ceramics contain calcium oxide, aluminum oxide, and an oxide of a rare earth element. The contents of calcium oxide and aluminum oxide are from 0.3 mass % to 1.5 mass % and from 14.2 mass % to 48.8 mass %, respectively, out of the total of 100 mass % of calcium oxide, aluminum oxide, and the oxide of the rare earth element. The remainder is the oxide of the rare earth element. The silicon nitride is β-sialon represented by a composition formula $Si_{6-z}Al_zO_zN_{8-z}$ (z=0.1 to 1) and has an average crystal grain size of 20 μm or less (excluding 0 μm). As such a ceramic, for example, the one described in Japanese Patent No. 5430389 B can be employed.

At least in the electrode mounting portions 5, an arithmetic mean roughness Ra in the roughness curve of the inner wall surfaces 3a and 3b in the direction parallel to an axial center of the through hole 3 is preferably 0.2 μm or less. The inner wall surfaces 3a and 3b having the arithmetic mean roughness Ra in the roughness curve of 0.2 μm or less can suppress the increase in the flow resistance of the cryogenic liquid caused by the inner wall surfaces 3a and 3b, and provide a stable flow velocity distribution of the cryogenic liquid. That is, the suppressed variation in the flow velocity can improve the measurement accuracy of the void fraction of the cryogenic liquid.

The arithmetic mean roughness Ra can be measured in accordance with JIS B 0601:2001 using a laser microscope (an ultra-deep color 3D profile measuring microscope (VK-X1000 or a successor model thereof) manufactured by KEYENCE CORPORATION). The measurement conditions may be set as follows: the illumination system is coaxial illumination, the measurement magnification is 240×, no cut-off value λs is set, the cut-off value λc is 0.08 mm, the end effect is corrected, and the measurement range is 1425 μm×1067 μm. The line roughness may be measured by drawing four lines to be measured at substantially equal intervals in the measurement range. The length of a single line to be measured is 1280 μm.

The relative density of a ceramic is, for example, from 92% to 99.9%. The relative density, relative to the theoretical density of a ceramic, is expressed as a percentage (ratio) of the apparent density of a ceramic which is determined in accordance with JIS R 1634-1998.

The insulating pipe 2 is made of a ceramic having a plurality of closed pores, and a value obtained by subtracting an average equivalent circle diameter of the closed pores from an average distance between the centers of gravity of adjacent closed pores (this value is hereinafter referred to as the interval between the closed pores) may be from 8 μm to 18 μm. The closed pores are independent of each other.

When the interval between the closed pores is 8 μm or greater, the closed pores are present in a relatively dispersed manner which increases mechanical strength. When the interval between the closed pores is 18 μm or less, even if a microcrack originating from the contour of a closed pore occurs due to repeated cold thermal shocks, the likelihood of the extension of the microcrack being blocked is high due to the surrounding closed pores. This means that the insulating pipe 2 having an interval between closed pores from 8 μm to 18 μm can be used over a long period of time.

The skewness of the equivalent circle diameter of the closed pores may be larger than the skewness of the distance between the centers of gravity of the closed pores. The skewness Sk is an index (a statistic) indicating how much a distribution is distorted from the normal distribution. That is, the skewness indicates a bilateral symmetry of the distribution. When the skewness is greater than 0, the tail of the distribution extends to the right. When the skewness is 0, the distribution is bilaterally symmetrical. When the skewness is less than 0, the tail of the distribution extends to the left.

Overlapping histograms of the equivalent circle diameter and the distance between the centers of gravity of the closed pores indicates that the mode value of the equivalent circle diameter is located on the left side (zero side) of the mode value of the distance between the centers of gravity of the closed pores, when the skewness of the equivalent circle diameter is larger than the skewness of the distance between the centers of gravity. This means that many closed pores with small equivalent circle diameters are present and such closed pores are present sparsely, so that the ceramic member having both mechanical strength and thermal shock resistance can be obtained.

For example, the skewness of the equivalent circle diameter of the closed pores is at least 1, and the skewness of the distance between the centers of gravity of the closed pores is 0.7 or less. The difference between the skewness of the equivalent circle diameter of the closed pores and the skewness of the distance between the centers of gravity of the closed pores is at least 0.3.

To determine the distance between the centers of gravity and the equivalent circle diameter of the closed pores, the insulating pipe 2 constituting the ceramic is polished on a copper disc using diamond abrasive grains having an average grain diameter $D_{50}$ of 3 μm from one end surface of the pipe along an axial direction. Subsequently, polishing is performed on a tin disc using diamond abrasive grains having an average grain diameter $D_{50}$ of 0.5 μm to obtain a polished surface having an arithmetic mean roughness (Ra) of 0.2 μm or less in the roughness curve.

The arithmetic mean roughness Ra of the polished surface is the same as that in the method described above. The polished surface is observed at 200× magnification and, with an average area selected, an area of, for example, 7.2×10 4 μm² (horizontal length 310 μm by vertical length 233 μm) is captured with a CCD camera to obtain an observation image. For this observation image, the distance between the centers of gravity of the closed pores is preferably obtained by a method called a distance between centers of gravity method for dispersivity measurement by using the image analysis software "A zou-kun (ver 2.52)" (trade name, manufactured by Asahi Kasei Engineering Corporation). Hereinafter, the term image analysis software "A zou-kun" refers to the image analysis software manufactured by Asahi Kasei Engineering Corporation throughout the description.

For example, the setting conditions for this method can be as follows: the threshold is 165 which is used as a measure of image brightness/darkness, the brightness level is set to dark, the small figure removal area is 1 μm², and no noise reduction filter is set. The threshold can be adjusted according to the brightness of the observation image. The brightness level is set to dark, the binarization method is set to manual, the small figure removal area is set to 1 μm², and the noise removal filter is set. Then, the threshold can be adjusted so that a marker appearing in the observation image matches the shape of the closed pore. For the equivalent circle diameter of the closed pores, a particle analysis method is used to determine the equivalent circle diameter of the open pores by using the observation image as a target. The setting conditions for this method may be the same as the setting conditions for calculating the distance between the centers of gravity of the closed pores.

The skewness of the equivalent circle diameter and the distance between the centers of gravity of the closed pores can be calculated using the Skew function provided in Excel (trade name of Microsoft Corporation).

An example of a method for manufacturing an insulating pipe made of a ceramic is described. A case where the main component of the ceramic forming an insulating pipe is alumina will be described.

The main component of aluminum oxide powder (purity of at least 99.9 mass %) is put into a pulverizing mill with powders of magnesium hydroxide, silicon oxide, and calcium carbonate, and a solvent (for example, ion-exchanged water). The mixture is pulverized until an average grain diameter $D_{50}$ of the powders is 1.5 μm or less. Subsequently, an organic binder and a dispersing agent for dispersing the aluminum oxide powder are added and mixed to obtain a slurry.

Of the total of 100 mass % of the powders described above, the content of magnesium hydroxide powder is from 0.3 to 0.42 mass %, the content of silicon oxide powder is from 0.5 to 0.8 mass %, the content of calcium carbonate powder is from 0.06 to 0.1 mass %, and the remainder includes aluminum oxide powder and incidental impurities.

The organic binder is an acrylic emulsion, polyvinyl alcohol, polyethylene glycol, polyethylene oxide, or the like.

Subsequently, the slurry is spray-granulated to obtain granules which are then pressurized at a molding pressure from 78 MPa to 118 MPa using a uniaxial press molding device or a cold isostatic press molding device to obtain a columnar powder compact.

The powder compact is cut, if necessary, to form a recess which becomes a recessed portion after firing.

Subsequently, the powder compact is fired at a firing temperature of from 1580° C. to 1780° C. and a retention time of from 2 hours to 4 hours to obtain an insulating pipe.

To obtain the insulating pipe having an interval between the closed pores from 8 μm to 18 μm, the firing temperature is set from 1600° C. to 1760° C. and the retention time is set from 2 hours to 4 hours to fire the powder compact. To obtain the insulating pipe having a skewness of the equivalent circle diameter of the closed pores larger than the skewness of the distance between the centers of gravity of the closed pores, the powder compact which is obtained by pressing at a molding pressure of from 96 MPa to 118 MPa may be fired at a firing temperature of from 1600° C. to 1760° C. and a retention time of from 2 hours to 4 hours. The surface of the insulating pipe facing the through hole may be ground to form an inner peripheral surface. A surface of the recessed portion on which the electrode is provided may be ground to form a bottom surface.

Figure 13:
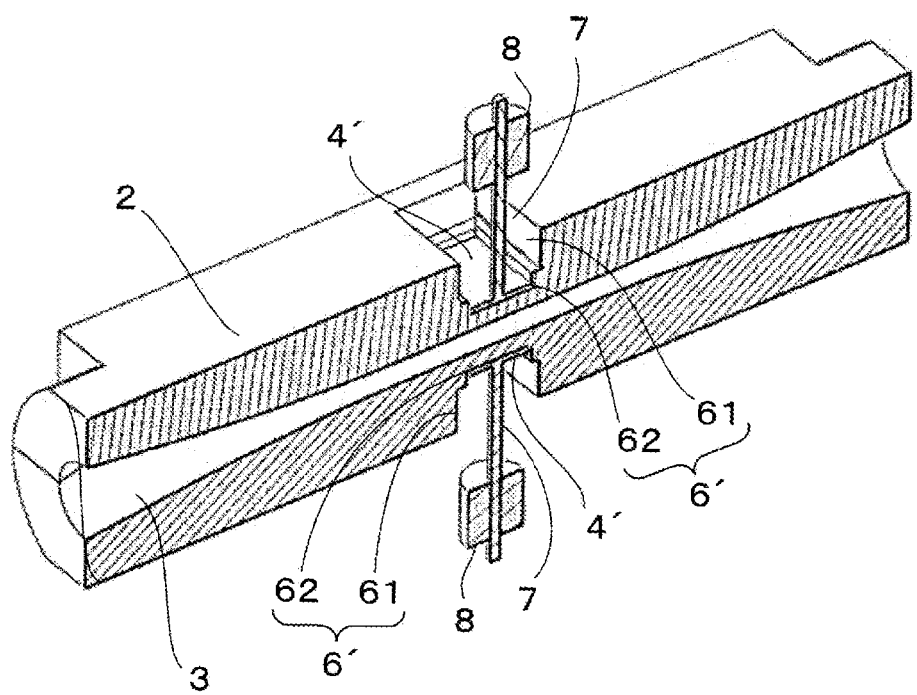
FIG. 13 is a vertical cross-sectional view illustrating a variation of the void fraction sensor illustrated in FIGS. 1 to 5.

FIG. 13 illustrates a variation of the embodiment illustrated in FIGS. 1 to 3. As illustrated in FIG. 13, recessed portions 6' each have a first recessed portion 61 which is open to the outside and a second recessed portion 62 provided on the bottom surface of the first recessed portion 61. The second recessed portion 62 has an opening area smaller than that of the first recessed portion 61, and an electrode 4' is mounted on the bottom surface of the second recessed portion 62. This further improves the positioning accuracy of the electrode 4', leading to further improvement of the measurement accuracy of the void fraction of the cryogenic liquid. Other portions are the same as those of the embodiment described above, and detailed description thereof will be omitted.

Another embodiment of the present disclosure will be described with reference to FIGS. 14 to 16. The same constituent members as those illustrated in FIGS. 1 to 13 are denoted by the same reference signs, and descriptions thereof will be omitted.

Figure 14:
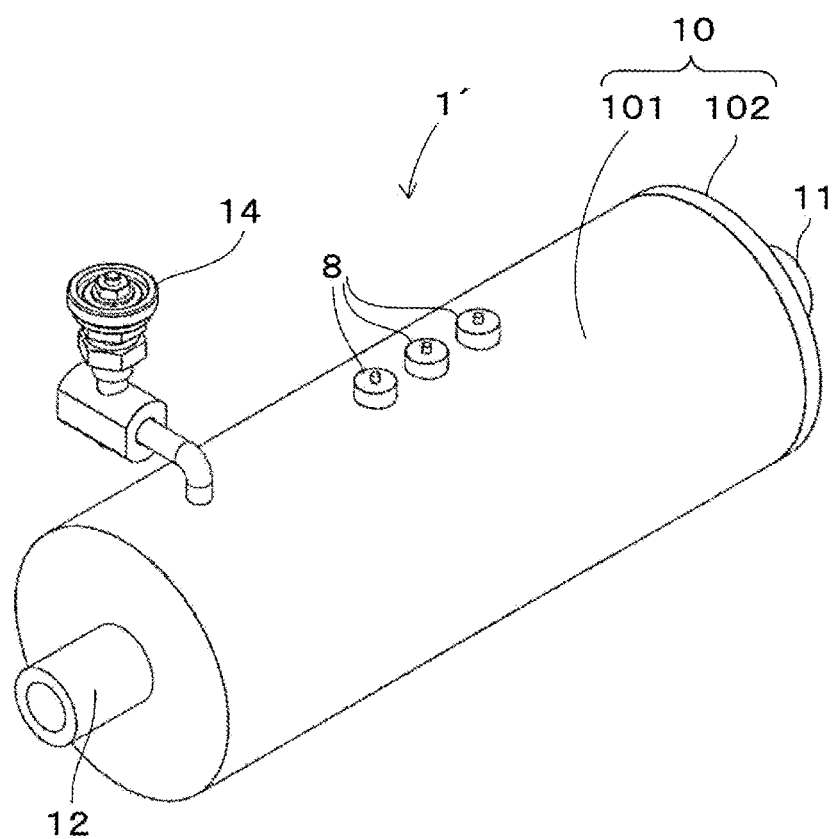
FIG. 14 is a schematic perspective view illustrating a void fraction sensor according to another embodiment of the present disclosure.

FIG. 14 illustrates a void fraction sensor 1' surrounded by the housing 10. FIGS. 15 and 16 are schematic perspective views illustrating a vertical cutaway surface and a horizontal cutaway surface, respectively.

Figure 15:
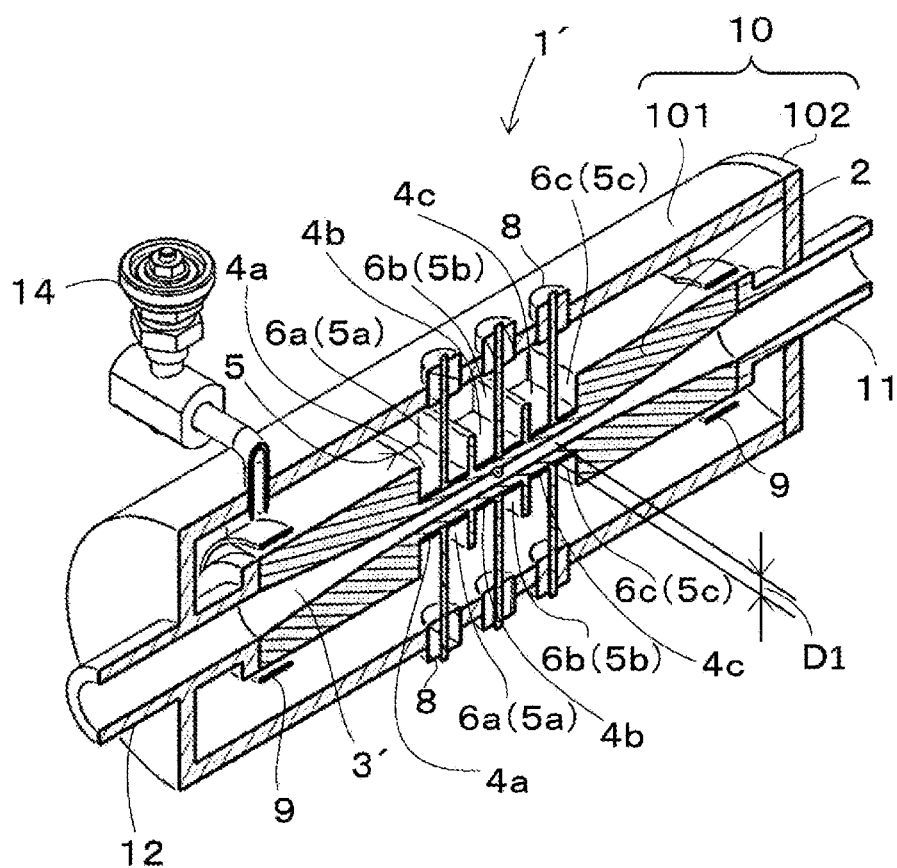
FIG. 15 is a schematic perspective view illustrating a vertical cutaway surface of the void fraction sensor illustrated in FIG. 14.
Figure 16:
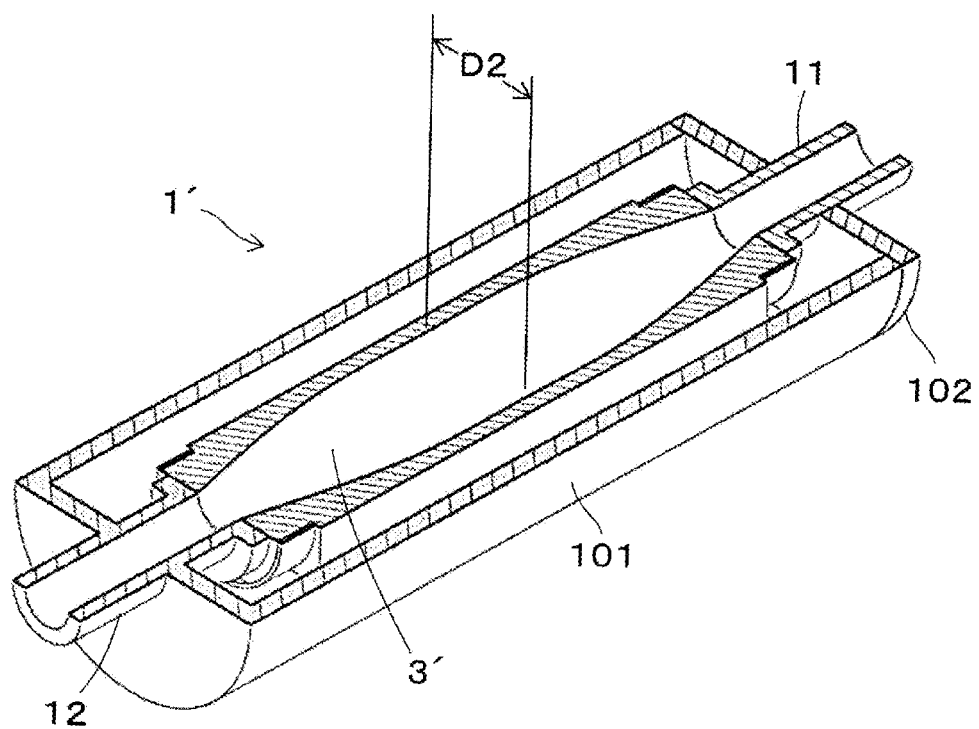
FIG. 16 is a schematic perspective view illustrating a horizontal cutaway surface of the void fraction sensor illustrated in FIG. 14.

As illustrated in FIG. 15, the void fraction sensor 1' according to the present embodiment includes a plurality of pairs of recessed portions 6a, 6b, and 6c that open in a direction perpendicular to an axial center of a through hole 3' of the insulating pipe 2. Electrodes 4a, 4b, and 4c are respectively mounted on the bottom surfaces of the recessed portions 6a, 6b, and 6c. The recessed portions 6a, 6b, and 6c are arranged along an axial center of the through hole 3'.

In the present embodiment, electrode mounting portions 5' refer to portions on which the plurality of electrodes 4a, 4b, and 4c are mounted, which are, for example, portions at which the recessed portions 6a, 6b, and 6c are formed.

Again, in the present embodiment, in the electrode mounting portions 5', the distance D1 between the inner wall surfaces of the electrodes 4a, 4b, and 4c in the direction perpendicular to the electrode surfaces is shorter than the distance D2 between the inner wall surfaces of the electrodes 4a, 4b, and 4c in the direction parallel to the electrode surfaces.

Since the void fraction is measured by the plurality of electrodes 4a, 4b, and 4c as described above, the measurement accuracy is further improved. Other portions are the same as those of the embodiment described above.

The flowmeter according to the embodiments of the present disclosure is described. The flowmeter measures a flow rate of the cryogenic liquid flowing in the through hole 3, 3', and includes the void fraction sensor 1, 1' described above, and a flow velocity meter which is not illustrated. The void fraction sensor 1, 1' and the flow velocity meter are attached to a cryogenic liquid transfer pipe which is not illustrated (hereinafter may be referred to as a transfer pipe).

Since the cryogenic liquid flowing in the transfer pipe is in a two-phase flow in which gas and liquid are mixed, the void fraction sensor 1, 1' measures the void fraction, from which a density d ($kg/m^3$) of the cryogenic liquid is determined. This is because the density d of the cryogenic liquid corresponds to the relative permittivity, and thus also corresponds to the capacitance measured by the void fraction sensor 1, 1'.

Accordingly, a flow rate F (kg/s) of the cryogenic liquid is determined by the following equation, where v is the flow velocity (m/s) of the cryogenic liquid determined by the flow velocity meter, and a is the cross-sectional area ($m^2$) of the through hole 3 in the electrode mounting portions 5.

$$F = d \times v \times a$$

To calculate this equation, the flowmeter further includes a calculator to which the void fraction sensor 1, 1' and the flow velocity meter are connected. This facilitates the measurement of the flow rate of the cryogenic liquid, leading to easier control of the cryogenic liquid when transferring a large amount of cryogenic liquid for industrial use.

Examples of the cryogenic liquid to be measured by the void fraction sensor 1, 1' of the present disclosure include liquid hydrogen (−253° C.), liquid nitrogen (−196° C.), liquid helium (−269° C.), liquefied natural gas (−162° C.), and liquid argon (−186° C.) (the values in parentheses indicate liquefaction temperatures). Therefore, the cryogenic liquid in the present disclosure is a liquid that is liquefied at a cryogenic temperature of −162° C. or lower.

Although the preferred embodiments of the present disclosure have been described above, the void fraction sensor according to the present disclosure is not limited thereto, and many changes and improvements can be made within the range set forth in the present disclosure.

REFERENCE SIGNS 1, 1' Void fraction sensor
2 Insulating pipe
21 Insulating pipe member
3, 3' Through hole
3a, 3b Inner wall surface
31 Inflow opening
32 Outflow opening
4, 4', 4a, 4b, 4c Electrode
5, 5', 5a, 5b, 5c Electrode mounting portion
6, 6', 6a, 6b, 6c Recessed portion
61 First recessed portion
62 Second recessed portion
7 Conductive pin
8 Hermetic terminal
9 Binding body
10 Housing
101 Frame body
102 Cover portion
11 First connecting pipe
12 Second connecting pipe
13 Insertion hole
14 Vacuum exhaust valve
15 Vacuum space
D1 (Shortest) Distance
D2 (Longest) Distance

The invention claimed is:

1. A void fraction sensor, comprising:
an insulating pipe having a through hole through which a cryogenic liquid flows; and
a pair of planar electrodes mounted on an outer wall surface of the insulating pipe, wherein
the insulating pipe comprises electrode mounting portions at which a distance D1 between inner wall surfaces of the insulating pipe in a direction perpendicular to electrode surfaces of the pair of planar electrodes is shorter than a distance D2 between inner wall surfaces of the insulating pipe in a direction parallel to the electrode surfaces of the pair of planar electrodes.

2. The void fraction sensor according to claim 1, wherein
in at least the electrode mounting portions, the inner wall surfaces facing each other and defining the distance D1 are parallel to each other, or
at least one inner wall surface of the inner wall surfaces is concavely curved when viewed from an axial center of the through hole.

3. The void fraction sensor according to claim 1, wherein
in at least the electrode mounting portions, the inner wall surfaces facing each other and defining the distance D2 are parallel to each other, or
at least one inner wall surface of the inner wall surfaces is convexly curved when viewed from an axial center of the through hole.

4. The void fraction sensor according to claim 1, wherein
a first connecting pipe having a supply hole on an inflow opening side of the through hole is connected to the insulating pipe, and
a cross-sectional area of the through hole perpendicular to an axial center of the through hole is from 90% to 110% of a cross-sectional area of the supply hole perpendicular to an axial center of the supply hole.

5. The void fraction sensor according to claim 1, wherein
a second connecting pipe having a discharge hole on an outflow opening side of the through hole is connected to the insulating pipe, and
a cross-sectional area of the through hole perpendicular to an axial center of the through hole is from 90% to 110% of a cross-sectional area of the discharge hole perpendicular to an axial center of the discharge hole.

6. The void fraction sensor according to claim 1, wherein
an arithmetic mean roughness Ra in a roughness curve of the inner wall surfaces in a direction parallel to an axial center of the through hole in at least the electrode mounting portions is 0.2 µm or less.

7. The void fraction sensor according to claim 1, wherein
a cross-sectional shape of the through hole perpendicular to an axial center of the through hole in at least the electrode mounting portions is elliptical or rectangular.

8. The void fraction sensor according to claim 1, wherein
the insulating pipe has a pair of recessed portions which are open to an outside of the insulating pipe in a direction perpendicular to the electrode surfaces of the pair of planar electrodes in at least the electrode mounting portions, and the outer wall surface of the insulating pipe on which the pair of planar electrodes are mounted includes bottom surfaces of the recessed portions.

9. The void fraction sensor according to claim 8, wherein the pair of recessed portions each comprise a first recessed portion open to the outside and a second recessed portion provided on a bottom surface of the first recessed portion, the second recessed portion has an opening area smaller than an opening area of the first recessed portion, and the outer wall surface of the insulating pipe on which the pair of planar electrodes are mounted includes the bottom surfaces of the second recessed portions.

10. The void fraction sensor according to claim 1, wherein the insulating pipe is made of a low-thermal-expansion ceramic.

11. The void fraction sensor according to claim 1, wherein the insulating pipe is made of a ceramic containing silicon nitride or sialon as a main component.

12. The void fraction sensor according to claim 1, wherein the insulating pipe is made of a ceramic having a relative permittivity of 11 or less in an operating temperature range.

13. The void fraction sensor according to claim 1, wherein the insulating pipe is made of a ceramic having a plurality of closed pores, and a value obtained by subtracting an average equivalent circle diameter of the plurality of closed pores from an average distance between centers of gravity of the plurality of closed pores that are adjacent is from 8 μm to 18 μm.

14. The void fraction sensor according to claim 13, wherein a skewness of the equivalent circle diameter of the plurality of closed pores is larger than that of the distance between centers of gravity of the plurality of closed pores.

15. A flowmeter for measuring a flow rate of a cryogenic liquid flowing through a through hole, comprising:

the void fraction sensor according to claim 1; and a flow velocity meter that measures a flow velocity of the cryogenic liquid flowing through the through hole.

16. A cryogenic liquid transfer pipe comprising:

the flowmeter according to claim 15.

* * * * *